Dec. 24, 1968    R. LENOBLE    3,417,676
REFLECTING PRODUCTS IN CEMENT CONGLOMERATE AND
THE PROCESS FOR THEIR MANUFACTURE
Filed June 8, 1965    2 Sheets-Sheet 2
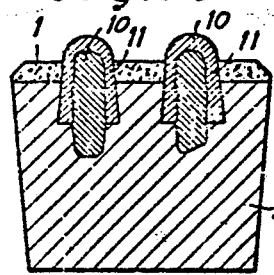
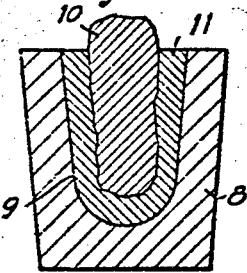
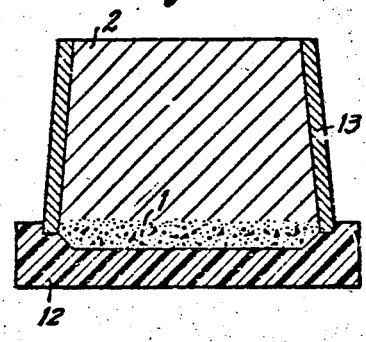
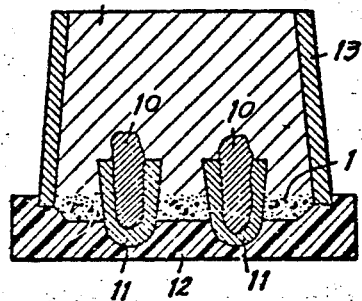
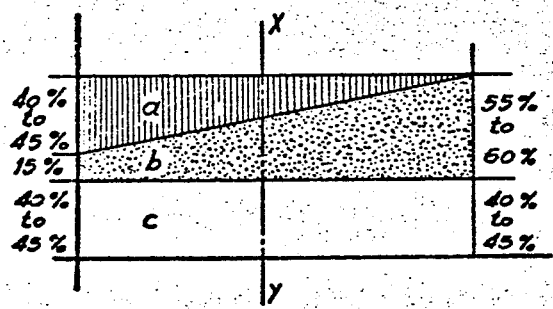
RAYMOND LENOBLE
INVENTOR.
BY Richards + Geier
ATTORNEYS 3,417,676
REFLECTING PRODUCTS IN CEMENT CONGLOMERATE AND THE PROCESS FOR THEIR MANUFACTURE
Raymond Lenoble, Rue du Moulin 1, Gosselies, Belgium
Filed June 8, 1965, Ser. No. 462,352
Claims priority, application Belgium, June 22, 1964, 649,560
1 Claim. (Cl. 94—1.5)

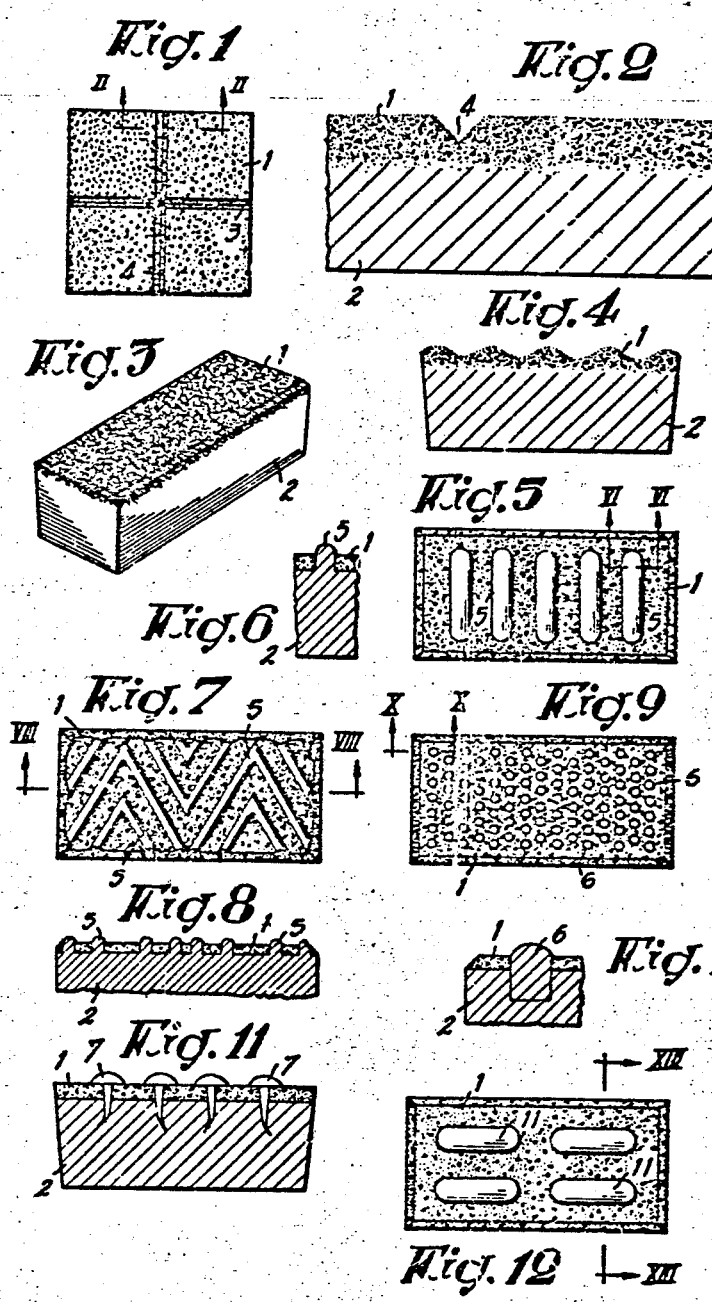

It is well known that for solving the problems of demarcation, road signs, road traffic and the like, there is a tendency to use reflecting paints. These paints consist generally of a mixture of a plastic mass of dyeing pigments and a very special filler formed by spherical glass elements having a very small diameter.

These paints are applied upon any carrier and more generally upon metallic panels. The luminosity results of such carriers so coated under the luminous rays of the headlights of vehicles are excellent.

However, the application field of such reflecting paints is relatively very restricted owing to the very high vulnerability of such coatings to any mechanical stress.

It is one of the reasons for which the applications have been restricted to posts, i.e. substantially safe from any mechanical stress such as impacts, wear strains, static or dynamic pressure and the like.

The present invention relates to any product in cement conglomerate having at least one side which is partially or entirely reflecting.

These products in cement conglomerate may be indifferently moulded under the form of paving-stones, slabs, pavement curbs, traffic panels, elements of indicating posts for road traffic and the like, decorative or advertising elements, namely for shop-signs, which may be inserted into a building and the like.

Another object of invention relates to the general process used for manufacturing such reflecting products, whatever the shape and sizes thereof may be.

The said reflecting products are essentially characterized in that they comprise the combination of two quite different textures, the one in a relatively reduced thickness at right angles with the reflecting faces being produced, and the other in a greater thickness, if desired reinforced, forming the impact mass.

The first texture forming the reflecting mass comprises substantially an intimate mixture of cement, quartz, dyeing pigments and a proportion of microballs in a transparent or reflecting material. The second texture forming the impact mass comprises a conglomerate of any composition known per se in accordance with the shapes, sizes and uses of reflecting products being manufactured. These masses are both made intimately integral so as to be inseparable, the assembly forming a combination in which one of the elements is essentially intended to provide both a high reflection degree for the light rays impinging upon it and a good resistance to weather and mechanical stresses, more particularly to friction and static and dynamic pressures, whereas the second element forms the proper resistance or impact mass and cooperates to give the determined shape to the product in accordance with its use.

According to another feature of the invention, the reflecting masses are only disposed locally in the appearing faces under duly predetermined shapes; either utilitarian or decorative elements are concerned.

According to still another feature of the invention, the appearing faces having a reflecting mass may be non-planar. In a very particular and novel embodiment of this configuration of the said appearing surfaces of the elements, the reflecting masses are disposed only in the recesses in such manner that the main stresses of the said elements would act upon the raised portions, thereby protecting still further the reflecting masses.

According to still another feature of the invention, complex elements may be readily obtained by embedding, into a mass carrier, inserts, cabochons, stone fragments, metallic elements or the like which are particularly provided to project and to form, in a manner, impact elements capable of protecting very efficiently the reflecting surfaces.

Of course, any natural or synthetic material, which is equivalent or has an equivalent function, may be substituted for the components described herein.

The proportions of the said components are also varying so that those skilled in the art may readily determine the accurate composition of these mixtures in accordance with the products being realized, the uses and the expected stresses. This determination is within the current knowledge of those skilled in the art, more particularly those skilled in the art of the manufactured concrete.

By way of information, but without any limitation excellent results have been obtained for several products within the following limits which are percents by weight relative to the dry material:

| | Percent by weight |
|---|---|
| Small spheres from 0.3 to 1 mm. | 15–55 |
| Quartz | 33–1 |
| Commercial cement | 40–45 |

In addition, a certain relationship may be established between the proportions of quartz and small spheres in accordance with the desired luminosity degree or the mechanical resistance of the reflecting surfaces.

Generally, a compromise will be made between said both factors in accordance with the intended uses. This compromise could apply a rule of inverse proportionality so that, for instance, a proportional reduction of the quartz proportion would correspond to an increase of the proportion of the small spheres and inversely. It is apparent that the main components could be admixed with any auxiliary agents selected namely among products generally used in the technics of the cement conglomerates.

The process according to the invention for the manufacture of such luminescent products comprises substantially starting from a mould, all or some walls of which are resilient, being made, e.g. of natural or synthetic rubber or still of any suitable plastic material, applying a layer of the said reflecting mass upon the bottom of the mould, the thickness of the said layer being itself determined by the very nature of the part being made and principally by the intended use thereof, subjecting said first mass to a vibrating effect to obtain a close texture, inducing at least a partial drying of the said reflecting mass, but in such manner that the equilibrium thereof be not disrupted, i.e., in such manner that it is not subjected to any detrimental mechanical stress or any differential pressures, then applying the impact concrete upon the said reflecting mass, possibly with the incorporation of reinforcements, this step of the process leading generally to the conventional filling of the mould, subjecting the so obtained complex mass to a vibrating effect, both for drying the texture of the impact concrete and to strengthen, by interpenetration, the sealing between both masses, namely the reflecting mass and the bottom layer and finally, after stripping, drying the part and cleaning the appearing surface of the reflecting mass by means of a diluted acid.

According to a feature of the invention, the delicate step of at least partially drying the reflecting mass after the first step of vibrating will be advantageously carried out by using an absorbing material which will be brought into contact with the said mass being dried.

The final cleaning of the reflecting surface will be advantageously carried out by using diluted hydrochloric acid.

Lands of the reflecting material having different colours could be also spread upon the bottom of the mould to produce surface and colour contrasts in accordance with the intended use of the products being manufactured. Slabs, pavement curbs or other elements for the construction of buildings and roads could be also produced while inserting therein small reflecting masses such as cabochons or catadioptric parallel strips and the like.

It is surprising that the process according to the invention may be rationally carried out mainly with the presence of a resilient material in the moulds at least at right angles with the reflecting surfaces, said resilient material not only protecting the small spheres against squeezing pressures or dangerous mechanical stresses, but allowing also a normal moulding while defining any projecting portions or elements.

This readiness feature will be still more apparent from the following description of embodiments given only by way of indication without any limitation with reference to the attached drawings wherein:

FIGURE 1 shows a plan view of a slab according to the invention;

FIGURE 2 is a section on the line II—II of FIGURE 1;

FIGURE 3 shows a perspective view of a paving stone according to the invention;

FIGURE 4 shows a longitudinal section of another embodiment of a paving-stone according to the invention;

FIGURE 5 shows a plane view of another embodiment of a paving-stone or slab according to the invention;

FIGURE 6 is a section on the line VI—VI of FIGURE 5;

FIGURE 7 shows a plane view of another embodiment of a paving-stone or slab according to the invention;

FIGURE 8 is a section on the line VIII—VIII of FIGURE 7;

FIGURE 9 shows a plane view of another embodiment of a paving-stone or slab according to the invention;

FIGURE 10 is a section on the line X—X of FIGURE 9;

FIGURE 11 shows a section of another embodiment of a paving-stone or slab according to FIGURE 9;

FIGURE 12 shows a plane view of another embodiment of a paving-stone or slab according to the invention;

FIGURE 13 is a section on the line XIII—XIII of FIGURE 12;

FIGURE 14 shows a cross section of a mould using the process of the invention for the manufacture of a paving-stone or slab according to FIGURE 13;

FIGURE 15 shows a cross section of a mould during the manufacture of cabochons used in the manufacture of paving-stones or slabs according to FIGURE 13;

FIGURE 16 shows a cross section of a mould using the process of the invention for the manufacture of paving-stones or slabs according to FIGURES 12 and 13;

FIGURE 17 is a diagram representing the distribution of the components of the products according to the invention.

The reflecting layer 1 and the bottom layer 2 are seen systematically in all the represented embodiments. More particularly, FIGURES 1 and 2 show a slab or tile the appearing face of which is divided by grooves 3—4. FIGURE 3 shows a perspective view of a paving-stone which may be used, e.g. for demarcating lines, footpaths on carriage roads or any similar uses. For that purpose, the upper face could be advantageously provided so that the reflecting elements get the best protection against detrimental stresses.

As represented in FIGURE 4, a first means comprises providing the appearing face of the element with a non-planar shape, e.g. a corrugated profile.

In such embodiment, even when the reflecting elements provided at the top of the corrugations are effected, broken or removed by impacts, pressure effects or the like, the reflecting effect will be maintained in the bottom of the recesses. For that purpose, the said portion of the element will be preferably conditioned in such manner that the projecting portions present a maximum resistance.

FIGURES 5 and 6 show such embodiment in which parallel ribs 5 having a good resistance are projecting from the reflecting surface 1.

These projections may be made of a material identical to that of mass 2 or still of materials having a greater hardness or a higher resistance to wear, impacts or any other stress. The said projections 5 may have any suitable shape and size. Another embodiment of such rafter projections 5 with very hard inserts is represented in FIGURES 7 and 8. As represented in FIGURES 9 and 10, these projections could also consist of cabochons 6 in any suitable material forming or non-forming a mass integral with the resistance mass 2. As represented in FIGURE 11, the cabochons 6 may be also formed by nail heads 7 like the nails used in the pedestrian crossing of the carriage roads.

As inserts for the said projecting portions or the said cabochons, very hard elements may be, for instance, embedded in the bottom layer 2, the said elements being formed by stone fragments or elements of hardened glass, metallic elements, elements of plastic material and the like.

Complex projecting elements could be also used as represented in FIGURES 12, 13 and 14. For that purpose, cabochons are formed, e.g. by starting from a special mould 8 having a cavity 9 designed in accordance with the cabochons being provided. A very resistant element 10 e.g. a rock fragment, is disposed in such cavity and the space outlined by the wall of the cavity 9 and the corresponding portion of the said element 10 is filled with a binder 11 which is also very hard and which is made of natural or synthetic material. Any suitable rock fragments 10 and binders 11 may be used.

After stripping, these elements 10–11 are set up in any suitable manner in the bottom layer 2 of a plate, a paving-stone, or slab or a tile while traversing the reflecting layer 1 and projecting therefrom. In fact, the projecting portions of the reflecting materials according to the invention may be generally provided in any suitable shape.

The process of this invention may be carried out very simply in that, as represented in FIGURE 15, there is used a two part mould, the bottom 12 of which is made of a plastic material and is essentially provided to define the layer 1 of the reflecting mass. The body 13 of the mould may be made of a hard material. It rests upon the said bottom 12 and it is subsequently filled with the bottom layer 2. The composite mass filling the said mould may be then subjected to any stress considered as being suitable by those skilled in the art, such as a pressing, ramming, vibrating effect or the like or even several of these stresses.

After a sufficient setting, the material with a reflecting face may be readily stripped and left for allowing the setting process of the binder to go on. The very characteristical presence of the bottom in resilient material 12 allows or promotes the production of any projecting parts. In fact, as represented in FIGURE 16, it should be noted that a material as complex as that represented by way of example in FIGURES 12, 13 and 14 would be very readily produced.

The components will be readily selected by those skilled in the art, for instance when considering a diagram according to the non-limitative example represented in FIGURE 17 wherein any ordinate X-Y corresponds to a determined percentage of the areas *a-b-c* relating respectively to the rock fragments, generally quartz, the small spheres and the binder.

The invention covers any reflecting product so obtained, as well as the process for their manufacture.

The invention relates as well as to the reflecting products under any shape and size as to the process used for the industrial manufacture of these products.

What I claim is:

1. Reflecting products for roads, comprising a bottom layer consisting of a cement conglomerate and a reflecting mass constituting a top layer and consisting of a thorough mixture of cement, finely divided hard rock, glass spheres and dyeing pigments, said reflecting mass having an outer reflecting surface provided with locally projecting portions made of rock fragments.

References Cited

UNITED STATES PATENTS

| | | | |
|---|---|---|---|
| 708,248 | 9/1902 | Orlinowski. | |
| 1,068,739 | 7/1913 | Cogswell | 94—5 |
| 1,619,733 | 3/1927 | Jeppson | 94—5 |
| 1,629,185 | 5/1927 | Tone | 94—15 X |
| 2,216,250 | 10/1940 | Nelson | 94—5 |
| 2,246,898 | 6/1941 | Sayre | 94—5 |
| 2,760,881 | 8/1956 | Toulmin | 94—15 X |
| 3,005,790 | 10/1961 | Wynn et al. | 94—1.5 X |
| 3,225,123 | 12/1965 | Wiswell | 94—1.5 |
| 3,215,051 | 11/1965 | Gill | 94—1.5 |

FOREIGN PATENTS

| | | |
|---|---|---|
| 638,429 | 3/1962 | Canada. |
| 1,155,779 | 5/1958 | France. |

JACOB L. NACKENOFF, *Primary Examiner.*

U.S. Cl. X.R.

94—7, 15